United States Patent
DePorter et al.

[11] Patent Number: 6,149,831
[45] Date of Patent: Nov. 21, 2000

[54] PERLITE-BASED INSULATION BOARD

[75] Inventors: Craig Donald DePorter; Steven Douglas Dawson, both of Denver; Mauro Vittorio Battaglioli, Lone Tree; Christopher Paul Sandoval, Littleton, all of Colo.

[73] Assignee: Johns Manville International, Inc., Denver, Colo.

[21] Appl. No.: 09/251,060

[22] Filed: Feb. 18, 1999

[51] Int. Cl.[7] .............................. D21J 1/00; D21H 17/61; E04B 1/74; C08L 95/00

[52] U.S. Cl. .......................... 252/62; 162/171; 162/145; 162/175; 162/147; 162/181.3; 162/181.7; 106/122; 106/282; 106/164.5; 106/164.53; 106/164.6; 106/204.01; 106/DIG. 2; 106/DIG. 7; 106/283; 428/403; 428/407

[58] Field of Search .................... 106/122, 282, 106/164.5, 164.53, 204.01, DIG. 2, 164.6, DIG. 7, 283; 162/145, 147, 171, 181.3, 181.6, 181.7, 175; 252/62; 428/403, 313.7, 407

[56] References Cited

U.S. PATENT DOCUMENTS

| | | | |
|---|---|---|---|
| 3,042,578 | 7/1962 | Denning . | |
| 3,779,860 | 12/1973 | Oshida et al. | 162/145 |
| 3,904,539 | 9/1975 | Ruff | 252/62 |
| 3,988,199 | 10/1976 | Hillmer et al. | 162/171 |
| 4,118,273 | 10/1978 | Godin et al. | 162/171 |
| 4,126,512 | 11/1978 | Hill | 162/145 |
| 4,313,997 | 2/1982 | Ruff et al. | 106/DIG. 2 |
| 4,587,278 | 5/1986 | Dotzauer et al. . | |
| 4,963,603 | 10/1990 | Felegi, Jr. et al. . | |
| 5,277,762 | 1/1994 | Felegi, Jr. et al. | 162/145 |
| 5,749,954 | 5/1998 | Law et al. . | |

Primary Examiner—Michael Marcheschi
Attorney, Agent, or Firm—John D. Lister

[57] ABSTRACT

An insulation board suitable for use as a roof insulating board has a density between about 8 and about 15 pounds per cubic foot; a MOR/density ratio of at least 10.5 to 1 and includes, by dry weight, between about 45% and about 76% expanded perlite; between about 15% and about 45% cellulosic fibers; between about 0.1% and about 10% latex binder; between about 2% and about 9% bituminous material; and about 0% to about 3% alum.

22 Claims, No Drawings

PERLITE-BASED INSULATION BOARD

BACKGROUND OF THE INVENTION

The present invention relates to an improved perlite-based insulation board especially designed for use in roof insulation systems, such as, but not limited to, built-up, modified bitumen and single ply roofing systems. Perlite-based insulation board has certain advantages over other types of insulation board used in roof insulation systems, such as wood-fiber, glass fiber and polymer foam insulation board. For example, perlite-based insulation board typically is lower in density and absorbs less water than either wood-fiber or glass fiber insulation board and the high inorganic content of the perlite-based insulation board renders it less flammable than either wood-fiber or polymer foam insulation board.

Perlite-based insulation boards, such as the perlite-based insulation boards marketed by Johns Manville International, Inc. under the trademark "FESCO", and retro-fit perlite based insulation boards have been commercially available for decades. These perlite-based insulation boards are highly satisfactory insulating products that are well adapted for use as insulation boards in built-up, modified bitumen and single ply roofing systems. These perlite-based insulation boards provide good thermal performance; are relatively low in density (generally ranging from about 8 to about 15 pounds per cubic foot); and exhibit good break load and flexural strength as well as good compressive resistance. These perlite-based insulation boards are also resistant to fire and water absorption and possess other desirable physical properties. The insulation board for roofing systems disclosed in U.S. Pat. No. 4,126,512, issued on Nov. 21, 1978, and entitled Perlitic Insulating Board, is representative of these types of perlite-based insulation boards and the disclosure of this patent is hereby incorporated by reference.

Other than expanded perlite, which constitutes between about 50% and about 76% by dry weight of these insulation boards, these perlite-based insulation boards comprise in the finished product between about 15% and about 45% by dry weight cellulosic fiber; between about 1% and about 5% by dry weight starch binder; between about 2% and about 9% by dry weight bituminous material to increase the insulation board's resistance to water absorption and about 0% to about 3% by dry weight alum.

While the above discussed perlite-based insulation boards perform very well, there has remained a need to improve the strength of such insulation boards and, preferably, without increasing or significantly increasing the water absorptivity of the insulation boards. Furthermore, since the perlite-based insulation boards are formed from an aqueous slurry containing the board ingredients in a continuous wet-laid process on free-draining equipment, such as a Fourdrinier machine, and subsequently, dried in an oven, any increase in the water retention of the boards delivered to the oven for drying can increase the manufacturing costs of the perlite-based insulation boards due to an increase in gas consumption in the drying process. Thus, it would be desirable to increase the strength of the perlite-based insulation boards with little or no increase in either the water absorptivity of the finished product or the water retention of the boards delivered to the oven for drying.

SUMMARY OF THE INVENTION

The present invention relates to a perlite-based insulation board of the general type discussed above, which is especially adapted for use as an insulation in roofing systems, such as, but not limited to, built-up, modified bitumen and single ply roofing systems. However, a latex binder is used in the perlite-based insulation board of the present invention which, desirably, increases the strength of the perlite-based insulation board relative the strength of current commercial perlite-based insulation boards. Latex binders have been available for many years and over the years have been used in numerous products, such as, but not limited to acoustical ceiling panels, as exemplified by U.S. Pat. No. 5,277,762, Felegi, Jr. et al, issued Jan. 11, 1994; U.S. Pat. No. 4,963,603, Felegi, Jr. et al, issued Oct. 16, 1990; U.S. Pat. No. 4,863,979, Beyersdorf et al, issued Sep. 5, 1989; and U.S. Pat. No. 4,587,278, Dotzauer et al, issued May 6, 1986. However, although latex binders have been available for many years, latex binders have never been used in perlite-based insulation boards for roofing systems.

The perlite-based insulation board of the present invention comprises, by dry weight, between about 45% and about 76% expanded perlite; between about 15% and about 45% cellulosic fibers; between about 0.1% and about 10% latex binder; between about 2% and about 9% bituminous material; and about 0% to about 3% alum and, preferably, between about 50% and about 72% expanded perlite; between about 23% and about 35% cellulosic fibers; between about 1% and about 8% latex binder; between about 2% and about 9% bituminous material; and about 0% to about 3% alum. The preferred fibers in the perlite-based insulation board are recycled newsprint fibers. However, while recycled newsprint fibers are preferred other cellulosic fibers can be used in limited amounts as a portion of the fibers in the perlite-based insulation board of the present invention. Preferably, non-cellulosic fibers are not used in the perlite-based insulation board of the present invention, thereby avoiding certain problems associated with non-cellulosic fibers, such as chemical incompatibility with wood pulp, environmental problems, relatively high costs, processing difficulties and other problems.

DESCRIPTION OF THE PREFERRED EMBODIMENTS

The perlite-based insulation boards of the present invention preferably have densities between about 8 and about 15 pounds per cubic foot; are typically two by four feet, four by four feet or four by eight feet in width and length; and range from about ½ of an inch to about 1½ inches in thickness. If desired, insulation boards of greater thicknesses can be formed by adhesively bonding and laminating two or more of the perlite-based insulation boards together.

The perlite-based insulation board of the present invention comprises, by dry weight, between about 45% and about 76% expanded perlite; between about 15% and about 45% cellulosic fibers; between about 0.1% and about 10% latex binder; between about 2% and about 9% bituminous material; and about 0% to about 3% alum and, preferably, between about 50% and about 72% expanded perlite; between about 23% and about 35% cellulosic fibers; between about 1% and about 8% latex binder; between about 2% and about 9% bituminous material; and about 0% to about 3% alum. While other cellulosic fibers can be included in the product, e.g. up to about 45% by dry weight of the fibers in the product, preferably, the cellulosic fibers are recycled newsprint fibers. As used herein, the term recycled newsprint fibers also includes recycled telephone book fibers and similar fibers.

The perlite particles used in the insulation boards of the present invention are expanded perlite particles preferably having a density of about 3 to about 6 pounds per cubic foot. Since the expanded perlite particles are inorganic, the expanded perlite particles contribute to the fire resistance of the insulation board. In addition, the perlite particles have excellent thermal insulating properties and greatly enhance the overall thermal insulating properties of the insulating boards.

The cellulosic fibers are used in the perlite-based insulation boards primarily for the strength that the cellulosic fibers add to the insulating board through the hydrogen bonding between the cellulosic fibers and an interfelting of the cellulosic fibers with the expanded perlite particles which assists in holding the expanded perlite particles in place within the insulation boards. The cellulosic fibers also act as a bulking material to maintain the perlite-based insulation boards within the desired density range for such products.

The bituminous material in the perlite-based insulation boards provides the insulation boards with a greater resistance to water absorption and also assists the cellulosic fibers in holding the expanded perlite particles in place within the insulation boards. In a preferred embodiment of the present invention, the expanded perlite particles are pre-coated with the bituminous material before being introduced into the slurry of the wet forming operation. While other bituminous materials could be used in the perlite-based insulation board of the present invention, asphalt is the preferred bituminous material. Asphalt is economical, readily available and performs well in the perlite-based insulation board of the present invention.

The polymeric binder in the perlite-based insulation board of the present invention can be any of numerous commercially available latex binders which function to assist in holding the interfelted fibers and expanded perlite particles together in the insulation board and, preferably, improve the strength of the perlite-based insulation board relative to perlite-based insulation boards of comparable thickness, width, length and density using starch binders. Of the latex binders, the preferred latex binders are acrylic latex binders, poly(vinyl acetate) latex binders, and styrene/butadiene rubbers (SBR), such as but not limited to Dow DL 242NA SBR; BF Goodrich HYCAR 26138 acrylic; BF Goodrich HYCAR 26288 acrylic; GenCorp 8045 carboxy modified SBR polymer; and BF Goodrich GOODRITE SB706 SBR.

Laboratory samples using starch and latex binders were made by repulping cellulosic fiber (source of fiber was surplus #1 News) in a hydropulper with warm water at approximately 120° F. The fiber was then collected and dewatered to about 20% solids. The actual solids determination was done by drying a small sample overnight. Laboratory boards were made using a Williams 14 inch×14 inch hand sheet former. The desired amount of pulp was stirred into about thirty pounds of water and allowed to mix for three minutes. Asphalt emulsion was then added and allowed to stir for one minute. The binder (starch or latex) was added and mixed for two minutes. The pH was then checked and adjusted with alum to a pH of 5.3 to 5.8. At least 12 ml of alum (20%) was added to all formulations, regardless of the pH. The expanded perlite was then added and was mixed for thirty seconds beyond the point where all of the perlite was wetted-out. The slurry was then transferred to the Williams apparatus and the water was allowed to substantially free drain until the edges of the slurry pulled away from the headbox sidewalls, then vacuum was applied for forty-five seconds. The wet board was then pressed to 1" or ½" for two minutes and then passed twice through a conveyed forced air oven at about 400° F. (total residence time about one and one half hours). The board was then dried at 250–270° F. overnight or over a weekend.

The breaking load strength of the boards was then tested by measuring the modulus of rupture (MOR). The modulus of rupture of the boards were determined according to the test procedure described in ASTM C 728/203, for evaluating the properties of building fiberboards through static bending. The results of those tests comparing samples made with the preferred latex binders listed above to samples made with starch binders follows. The densities of the samples are in pounds per cubic foot.

| Binder | SAMPLE Density | AVERAGE MOR/DENSITY | AVG. MOR |
|---|---|---|---|
| DOW DL242NA SBR | 9.71 | 11.70 | 113.9 |
| BF GOODRICH HYCAR 26138 ACRYLIC | 8.53 | 12.30 | 107.9 |
| BF GOODRICH HYCAR 26288 ACRYLIC | 8.67 | 11.26 | 97.7 |
| GENCORP 8045 CARBOXYLATED SBR POLYMER | 8.72 | 11.18 | 97.5 |
| BF GOODRICH GOODRITE SB706 | 8.53 | 11.18 | 95.3 |
| BF GOODRICH 913-661-18-15 SB | 8.83 | 10.70 | 94.5 |
| NATIONAL STARCH - DURABOND A STARCH CONTROL RANGED | | | |
| FROM | 9.02 | 10.33 | 93.1 |
| TO | 8.67 | 8.49 | 73.6 |

As shown in the above table, when comparing the average modulus of rupture to density ratio and the average modulus of rupture, the samples made with the preferred latex binders out performed the control samples with the starch binder. In particular, the MOR/density ratio for samples made with the latex binders ranged from 10.70 to 1 to 12.30 to 1 while the MOR/density ratio for the control samples made with starch binders ranged from 8.49 to 1 to 10.33 to 1.

The modulus of rupture of an insulating board is significant with respect to the overall strength and rigidity of the insulation board, particularly with respect to the ability of the insulation board: to be handled somewhat roughly in the field during shipment and installation; to withstand traffic over the insulation board after installation; and to be capable of spanning relatively widely spaced roof deck supports. With an increase in the modulus of rupture, the chance of breakage or fracture of the boards due to abuse during handling, shipping and installation is reduced.

Since the modulus of rupture is affected by the density of the insulation board, the relative strengths of the insulation boards of the present invention to each other and to other insulation boards is expressed as the MOR/density ratio where the density is expressed in pounds per cubic foot. The perlite-based insulation boards of the present invention have a MOR/density ratio of: at least 10.5 to 1; preferably at least 11.0 to 1; more preferably at least 11.5 to 1 and most preferably at least 11.75 to 1.

While the water absorption of samples made with the above listed latex binders varied, almost all samples made with the above listed latex binders exhibited a low water absorption of about 5.0% or less by volume and many exhibited a low water absorption of about 1.5% or less by volume, especially samples made with the preferred acrylic and SBR binders. The water absorption of the boards was determined according to the test procedure described in ASTM Test C-728/C-209, entitled "Testing Structural Insulating Board Made From Vegetable Fibers", in the section entitled "Water Absorption" and as used herein, the term "water absorption" refers to water absorption as determined by the ASTM C-728/C-209 test procedure.

With respect to insulation boards used in roofing systems, the problem of major concern is not so much whether a board can hold a certain amount of water for a long time without disintegrating but whether water entering an insulation board through a point of failure in the roof covering material will be substantially contained in the localized area of the failure or spread rapidly throughout the entire insulating layer due to a high absorptivity of the insulation board. Since excess moisture in an insulation board has a deleterious effect on the strength and the insulating properties of the insulation board, it is important that the deleterious effects of water entering a insulation board at a point of roof failure be kept localized in the area adjacent the point of failure. The low absorptivity of the perlite-based insulation boards of the present invention protects against the undesirable spreading of excess moisture throughout the insulation boards when there is a failure of the roof covering material and the preferred perlite-based insulation boards of the present invention have a water absorption as measured by ASTM Test C-728/C-209 of about 5.0% or less by volume, preferably about 3.5% or less by volume, and more preferably, about 1.5% or less by volume.

Alum is used, when needed, to adjust the pH level of the slurry of ingredients being formed into the perlite-based insulation board to a desired level, e.g. between about 5.3 and about 5.8 so that the perlite-based insulation board is formed correctly.

In the production of the perlite-based insulation board of the present invention, the perlite particles are expanded and, preferably coated with a hot melt asphalt; the cellulosic fibers are pulped in a conventional pulper; and the latex binder is mixed with water. An asphalt emulsion can be introduced into the pulper in place of pre-coating the expanded perlite particles or in addition to pre-coating the expanded perlite particles. Alum can also be introduced into the pulper, if needed, to adjust the pH levels of the slurry. These ingredients are then transferred from their respective storage facilities and metered into an infuser where the ingredients are blended and delivered as a slurry to a wet forming apparatus such as a Fourdrinier machine. The wet forming apparatus transforms the slurry of ingredients into a wet-laid mat of a selected thickness, density and percent solids. The wet-laid mat is then passed through a drier where it is dried into a perlite-based insulation board. The perlite-based insulation board is conveyed to a finishing area where the insulation board is cut and trimmed into insulation boards of the desired widths and lengths.

The perlite-based insulation boards of the present invention with their latex binders, exhibit a greater breaking load strength than perlite-based insulation boards of the same density made with starch binders. The water absorption properties of the is perlite-based insulation boards of the present invention are acceptable and preferably, the water absorption characteristics exhibited by the perlite-based insulation boards of the present invention are 5% or less by volume and, most preferably, 1.5% or less by volume. In addition, it was found that the perlite-based insulation boards of the present invention met other required criteria including processing criteria such as drainage rate. In summary, the perlite-based insulation boards of the present invention are not only stronger than the prior perlite-based insulation boards made with starch, but the perlite-based insulation boards of the present invention can be produced at a cost comparable to the perlite-based insulation boards made with starch and exhibit low water absorptivity properties.

The perlite-based insulation boards of the present invention are normally coated on at least one major surface (a surface intended to be the upper surface) with a coating material that is coextensive with that major surface and facilitates the application of built-up roofing systems over the perlite-based insulation boards. One such coating material includes:

| | COMPOSITION BY WEIGHT (WET) | |
| MATERIAL | RANGE | PREFERRED |
| --- | --- | --- |
| Water | 88.8%–95.8% | 91.5% |
| Asphalt Emulsion | 1.5%–2.5% | 2.0% |
| Vermiculite | 2.0%–9.0% | 5.5% |
| Carbon Black | 1.0%–2.0% | 1.0% |

Another such coating material, for use with the direct torch application of modified asphalt membranes, includes:

| | COMPOSITION BY WEIGHT (WET) | |
| MATERIAL | RANGE | PREFERRED |
| --- | --- | --- |
| Water | 36.0%–40.0% | 37.1% |
| Bentonite Clay | 4.8%–5.3% | 5.2% |
| Asphalt Emulsion | 53.8%–56.0% | 53.8% |
| Thickener | 0.5%–1.0% | 0.9% |
| Sodium Silicate | 0.0%–5.0% | 3.0% |

By the term "consisting essentially of" is meant that additional ingredients may be added provided they do not substantially alter the nature of the composition. Substances which cause the average modulus of rupture/density ratio to drop below 10.5 to 1 or which cause the water absorption to increase above 5% by volume, as well as substances which materially and adversely affect the processing of the composition into an insulation board are substances which do substantially alter the composition. In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. An insulation board for use as a roof insulating board:
   the insulation board having a density between about 8 and about 15 pounds per cubic foot and a MOR/density ratio of at least 10.5 to 1; the insulation board having a major surface adapted to be an upper major surface over which built-up roofing is to be applied; the insulation board comprising the following ingredients:
   expanded perlite between about 45% and about 76% by dry weight;
   cellulosic fibers between about 15% and about 45% by dry weight;
   latex binder about 0.1% to about 10% by dry weight;
   bituminous material about 2% to about 9% by dry weight; and alum about 0% to about 3% by dry weight; and a coating on the major surface of the insulation board that is essentially coextensive with the major surface of the insulation board; and the coating being formed from a coating composition comprising by weight (wet):

| Water | 88.8%–95.8% |
|---|---|
| Asphalt Emulsion | 1.5%–2.5% |
| Vermiculite | 2.0%–9.0% |
| Carbon Black | 1.0%–2.0%. |

2. The insulation board according to claim 1, wherein: the cellulosic fibers are recycled newsprint fibers.

3. The insulation board according to claim 2, wherein: the board has a water absorption of 5% or less by volume.

4. The insulation board according to claim 3, wherein: the latex binder is selected from a group consisting of acrylic; poly(vinyl acetate) and styrene/butadiene rubber binders.

5. The insulation board according to claim 1, wherein: the latex binder is selected from a group consisting of acrylic; poly(vinyl acetate) and styrene/butadiene rubber binders.

6. The insulation board according to claim 5, wherein: the board has a water absorption of 5% or less by volume.

7. The insulation board according to claim 1, wherein: the board has a MOR/density ratio of at least 11 to 1.

8. The insulation board according to claim 7, wherein: the cellulosic fibers are recycled newsprint fibers.

9. The insulation board according to claim 8, wherein: the board has a water absorption of 5% or less by volume.

10. The insulation board according to claim 9, wherein: the latex binder is selected from a group consisting of acrylic; poly(vinyl acetate) and styrene/butadiene rubber binders.

11. The insulation board according to claim 1, wherein: the latex binder is present in an amount between about 1% and about 8% by dry weight; and the board has a water absorption of 5% or less by volume.

12. An insulation board for use as a roof insulating board: the insulation board having a density between about 8 and about 15 pounds per cubic foot and a MOR/density ratio of at least 10.5 to 1; the insulation board having a major surface adapted to be an upper major surface over which built-up roofing is to be applied; the insulation board comprising the following ingredients:

expanded perlite between about 45% and about 76% by dry weight;

cellulosic fibers between about 15% and about 45% by dry weight;

latex binder about 0.1% to about 10% by dry weight;

bituminous material about 2% to about 9% by dry weight; and alum about 0% to about 3% by dry weight; and a coating on the major surface of the insulation board that is essentially coextensive with the major surface of the insulation board; and the coating being formed from a coating composition comprising by weight (wet):

| Water | 36.0%–40.0% |
|---|---|
| Bentonite Clay | 4.8%–5.3% |
| Asphalt Emulsion | 53.8%–56.0% |
| Thickener | 0.5%–1.0% |
| Sodium Silicate | 0.0%–5.0%. |

13. The insulation board according to claim 12, wherein: the cellulosic fibers are recycled newsprint fibers.

14. The insulation board according to claim 13, wherein: the board has a water absorption of 5% or less by volume.

15. The insulation board according to claim 14, wherein: the latex binder is selected from a group consisting of acrylic; poly(vinyl acetate) and styrene/butadiene rubber binders.

16. The insulation board according to claim 12, wherein: the latex binder is selected from a group consisting of acrylic; poly(vinyl acetate) and styrene/butadiene rubber binders.

17. The insulation board according to claim 16, wherein: the board has a water absorption of 5% or less by volume.

18. The insulation board according to claim 12, wherein: the board has a MOR/density ratio of at least 11 to 1.

19. The insulation board according to claim 18, wherein: the cellulosic fibers are recycled newsprint fibers.

20. The insulation board according to claim 19, wherein: the board has a water absorption of 5% or less by volume.

21. The insulation board according to claim 20, wherein: the latex binder is selected from a group consisting of acrylic; poly(vinyl acetate) and styrene/butadiene rubber binders.

22. The insulation board according to claim 12, wherein: the latex binder is present in an amount between about 1% and about 8% by dry weight; and the board has a water absorption of 5% or less by volume.

* * * * *